(12) United States Patent
Pfohl et al.

(10) Patent No.: US 8,620,550 B2
(45) Date of Patent: Dec. 31, 2013

(54) MEASURING BRAKE WEAR

(75) Inventors: Kevin L. Pfohl, Dickeyville, WI (US); Eric R Anderson, Ames, IA (US); Mark J Besler, Asbury, IA (US)

(73) Assignee: Deere & Company, Moline, IL (US)

( * ) Notice: Subject to any disclaimer, the term of this patent is extended or adjusted under 35 U.S.C. 154(b) by 234 days.

(21) Appl. No.: 13/036,800

(22) Filed: Feb. 28, 2011

(65) Prior Publication Data

US 2012/0221184 A1    Aug. 30, 2012

(51) Int. Cl.
*G06F 7/70* (2006.01)

(52) U.S. Cl.
USPC .............................................. 701/70; 701/22

(58) Field of Classification Search
USPC ........................................... 701/2, 83, 70, 22
See application file for complete search history.

(56) References Cited

U.S. PATENT DOCUMENTS

| | | | |
|---|---|---|---|
| 3,499,164 A | 3/1970 | Ferre et al. | |
| 3,863,038 A | 1/1975 | Kreitner et al. | |
| 4,186,822 A | 2/1980 | Khuntia et al. | |
| 4,263,991 A | 4/1981 | Morgan et al. | |
| 4,790,606 A | 12/1988 | Reinecke | |
| 4,951,769 A | 8/1990 | Kawamura | |
| 5,343,971 A | 9/1994 | Heidelberg et al. | |
| 5,371,412 A | 12/1994 | Iwashita et al. | |
| 5,545,928 A | 8/1996 | Kotani | |
| 5,785,158 A | 7/1998 | Grimm | |
| 6,648,427 B1 * | 11/2003 | Wuerth et al. | 303/155 |
| 6,752,227 B1 | 6/2004 | Bachmann | |
| 7,204,564 B2 * | 4/2007 | Brown et al. | 303/7 |
| 7,653,486 B2 * | 1/2010 | Takahashi et al. | 701/301 |
| 7,742,852 B1 | 6/2010 | Tang | |
| 7,860,629 B2 * | 12/2010 | Schweizer et al. | 701/51 |
| 2005/0173980 A1 * | 8/2005 | Bohm et al. | 303/155 |
| 2006/0076196 A1 * | 4/2006 | Palladino | 188/1.11 W |
| 2007/0013228 A1 * | 1/2007 | Lingman | 303/9.62 |
| 2008/0092641 A1 * | 4/2008 | Cahill et al. | 73/121 |
| 2009/0039874 A1 * | 2/2009 | Kreit et al. | 324/207.17 |
| 2009/0174396 A1 * | 7/2009 | Howard | 324/207.24 |
| 2010/0030490 A1 * | 2/2010 | Wright et al. | 702/34 |
| 2010/0174465 A1 * | 7/2010 | Gibson et al. | 701/70 |

* cited by examiner

*Primary Examiner* — Hussein A. Elchanti

(57) ABSTRACT

A final drive assembly is driven by an electric motor and includes a park and service brake arrangement including a shared disc brake pack that is compressed by a preload exerted by a compression spring arrangement defined by a stack of Belleville springs for establishing an engaged park brake condition in the absence of pressurized brake actuating fluid being routed to a park brake piston. An electrical control is provided for computing disc brake pack wear based on a stored load curve of the stack of Belleville springs containing information correlating preload amounts to various compressed heights of the stack of Belleville springs, and on the magnitude of a drive signal sent to the electric motor for causing sufficient drive torque to be developed for causing the rotor discs of the engaged disc brake pack to slip relative to the stator discs.

3 Claims, 4 Drawing Sheets

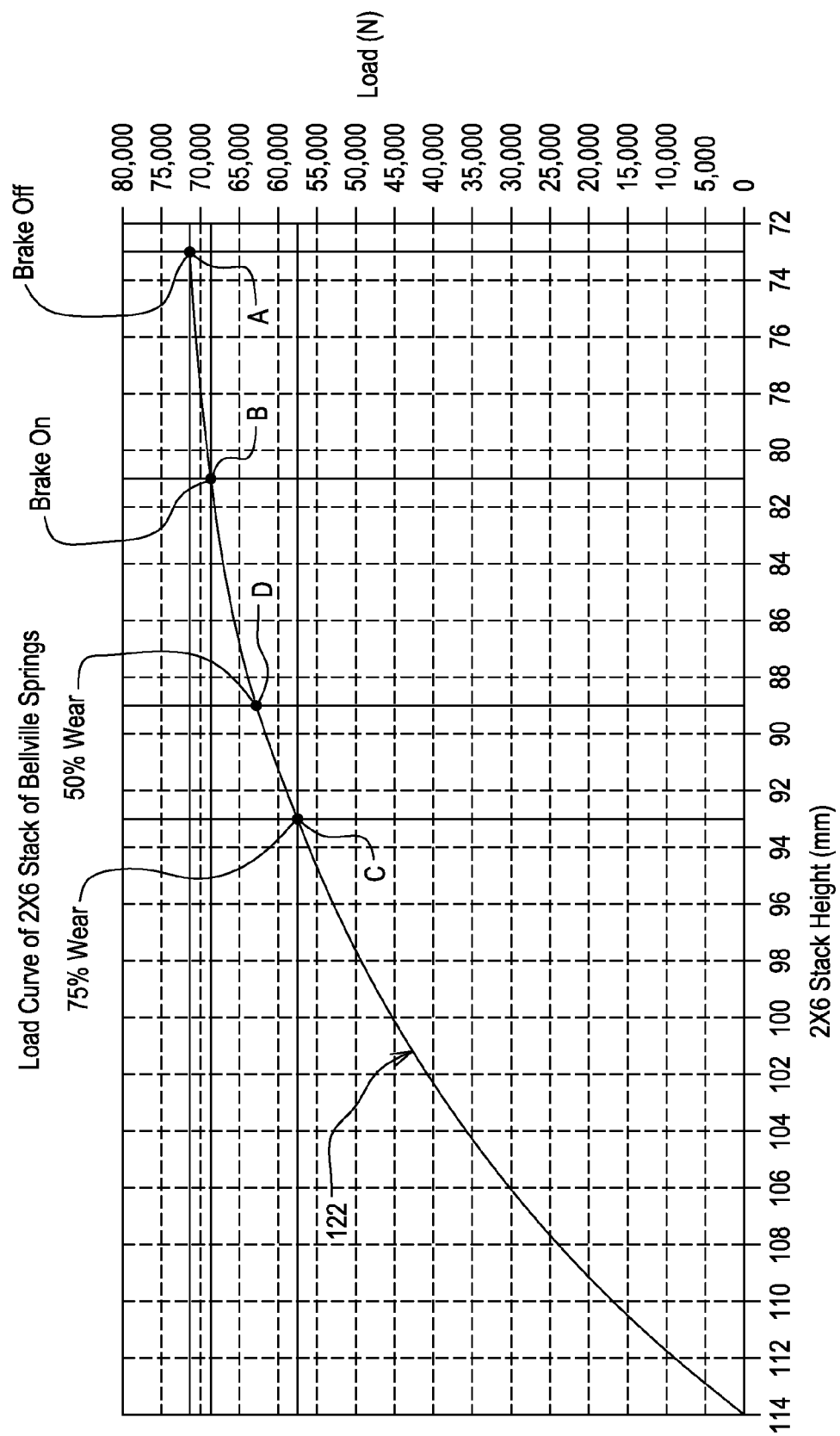

MEASURING BRAKE WEAR

FIELD OF THE INVENTION

The present invention relates to vehicle service and park brakes, and, more particularly, relates to devices for indicating brake wear of a brake disc pack of a service and park brake assembly embodied in a final drive assembly including an input drive shaft driven by an electric motor.

BACKGROUND OF THE INVENTION

Routine service on many types of machines and vehicles involves checking the status of the brakes, in particular, the wear of brake pads or disks forming part of the brakes. Much effort has been made by designers to arrive at a good method for measuring brake wear. Additionally, there are regulations in some areas that mandate regular capacity checks on park brakes.

The issue, especially in wet brakes used in construction equipment having final drives embodying speed reduction gearing, is that checking the amount of wear visually or mechanically is difficult due to the brakes being housed at a location inboard of the final drive gears, wheel drive hub and spindle or axle. Tests to determine the reliability of parking brakes are becoming routine but have the drawback that most are pass/fail type tests with a failure requiring that the machine be shut down until the condition giving rise to the failure is remedied.

It is known to monitor the wear of a disc brake pack forming part of a park and service brake assembly used to brake a wheel of an industrial, off-road vehicle without requiring the disassembly of the brake assembly. This monitoring is done by using a depth gauge to measure the movement of the brake piston required for engaging the disc brake pack when the latter is new and comparing this value with subsequent measurements made during the service life of the disc brake pack. If the difference between the two measurements is within a specified wear limit, the disc brake pack need not be replaced, but if the difference exceeds the wear limit, new disc plates are required. Such a brake monitoring arrangement is disclosed in U.S. Pat. No. 4,186,822, issued Feb. 5, 1980. This wear measurement arrangement has the disadvantage that the brake piston for effecting engagement of the brake disc pack must be located so as to be accessible for permitting its movement to be manually measured, thus placing design constraints on where a park and service brake assembly may be placed when used with a final drive arrangement. This wear measurement has the further disadvantage of requiring the operator to dismount the cab and manually perform measurements, which is time-consuming.

Another known way of monitoring the wear of a vehicle wheel disc brake pack is to use an electronic control unit which receives wear value output signals from a distance sensor mounted on one or more brake lining supports, which measures the distance of the mount from the braked element. The electronic control unit has in memory an allowable wear value to which the measured wear value is compared, with the control unit emitting a warning signal when the measured wear value equals the allowable wear value. Also, the measured wear value can be indicated in a wear indicator apparatus. A less direct way of measuring wear is by storing a family of characteristics in the memory of the electronic control unit which correlate the brake lining temperatures, brake lining thickness and strength of the electronic signal fed to a brake torque control apparatus. On the basis of this stored family of characteristics, the electronic control unit forms a wear value signal from the strength of the signal fed to the braking torque control apparatus and the indicated brake lining temperature, which wear value signal characterizes the thickness and thus the wear of the brake lining. Thus, in a sense, the temperature sensors are also wear value transmitters, the transmitted wear value signal being converted into readings on a scale, if desired. U.S. Pat. No. 4,790,606 discloses such a wear monitoring apparatus.

It is also known to determine the integrity of a vehicle wheel braking device in an arrangement wherein the torque producing capability of the drive system is sufficiently large to override the braking toque produced. In this arrangement, the brake is first applied, and then sufficient torque is applied to the drive shaft to cause the brake to slip so that the drive shaft rotates a predetermined rotational distance, one revolution for example, about its axis. Slipping the brake causes relative motion between the brake plate and the reaction plate. This relative motion generates a braking torque between a brake-applying member and the reaction plate, the relative motion being measured and compared to reference values to verify brake functional integrity. U.S. Pat. No. 5,785,158 discloses such a brake integrity monitor. This manner of checking brake integrity has the drawback of requiring a sensor arrangement for determining the relative rotation between the brake-applying member and the reaction plate, which adds additional cost to the final drive arrangement.

What is desired then is some way to be able to reliably and economically measure wear of a disc brake pack of a vehicle service and park brake arrangement embodied in an electric motor driven final drive in a location making it difficult to visually or mechanically inspect the disc brake pack and to predict brake failure so that a customer is alerted to the need for servicing the brakes in order to avoid brake failure.

SUMMARY OF THE INVENTION

According to the present invention, there is provided a novel way of determining brake wear, especially the wear of discs of wet brakes which form part of a service and park brake assembly and are driven by an electric motor.

An object of the invention is to determine final drive brake wear by comparing a break-free torque required for causing a worn disc brake pack of a spring-engaged park brake to slip to a break-free torque required for causing a new disc brake pack to slip, these torques been determined by a command signal sent for causing rotation of an output shaft of an electric drive motor of the final drive, and by determining a corresponding loss in preload of the brake-applying spring arrangement and determining the difference in length of the spring arrangement existing at the new and worn disc brake pack conditions, and determining brake disc wear from this difference in length.

The foregoing object is achieved by providing a load curve relating to the spring arrangement used for biasing the brake pack into its engaged condition, the load curve plotting the preload exerted by the spring arrangement as a function of the length of the brake-applying spring arrangement, storing this load curve in a memory of an electric controller, then determining the break-free torque required to cause slippage between the rotor and stator discs of the brake pack as a function of the command signal being sent to the motor at the time slippage takes place, and by using this torque in a calculation determining the load which was exerted by the spring arrangement corresponding to the break-free torque, and then using this load to enter the stored load curve to arrive at the spring arrangement length existing at the time of the test, this length being compared with a stored length of the spring arrangement of a new brake stack so as to derive a brake disc wear amount. In the present disclosure, the brake arrangement comprises a 2×6 stack of Belleville springs. This wear amount is displayed for the operator, and if desired, is compared with an allowable wear amount stored in memory, with a signal being given to alert the operator when the measured wear equals the allowable wear.

Thus, it will be appreciated that the ability of the electric controller to easily derive a break-free torque value from the command signal being sent to the motor at the time slippage occurs in the disc pack makes it possible to determine the break-free torque without requiring any other measuring device.

This and other objects of the invention will become apparent from a reading of the ensuing description together with the appended drawings.

BRIEF DESCRIPTION OF THE DRAWINGS

FIG. 4 is a view showing a load curve of a 2×6 stack of Belleville springs charting preload versus stack height.

DESCRIPTION OF THE PREFERRED EMBODIMENT

Figure 1:
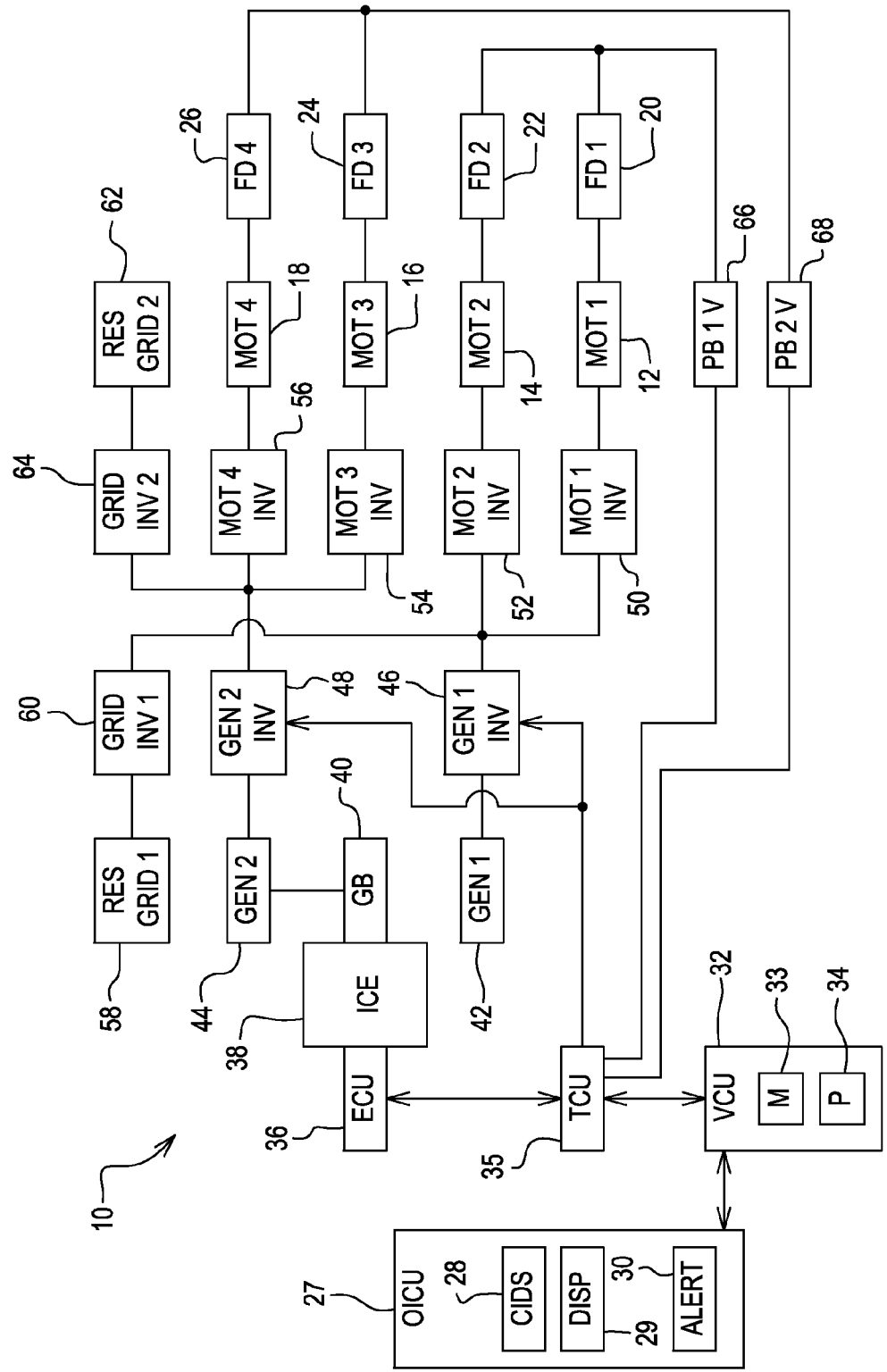
FIG. 1 is a simplified block diagram showing a controller network for controlling operation of electric motors for driving four ground wheels of a work vehicle.

Referring now to FIG. 1, there is shown a motor control system 10 for controlling four identical wheel drive Motors (MOT 1) 12, (MOT 2) 14, (MOT 3) 16 and (MOT 4) 18 having output shafts coupled for respectively delivering torque for driving four identical Final Drives (FD 1) 20, (FD 2) 22, (FD 3) 24 and FD 4) 26 for driving front and rear pairs of drive wheels (not shown) of an industrial vehicle such as a loader, for example. The electric Motors 12, 14, 16 and 18 are preferably 3-phase switched reluctance motors, but need not be.

The motor control system 10 includes an Operator Interface Control Unit (OICU) 27 including Control Input Devices (CIDS) 28 such as throttle and brake test input buttons, for example, by which an operator may send out various control signals. The OICU 27 also includes a Display (DISP) 29 and an Alert Device (AD) 30, the latter being an audio or visual alert device such as a buzzer or light, for example, by which an operator is alerted to certain operating conditions. Control signals or instructions sent from the OICU 27 are coupled to a Vehicle Control Unit (VCU) 32, which acts in response to these signals or instructions to forward appropriate control signals or instructions on to a Transmission Control Unit (TCU) 34, provided for controlling the operation of the wheel drive motors 12, 14, 16 and 18, and for this purpose is coupled to an Engine Control Unit (ECU) 36 of an Internal Combustion Engine (ICE) 38. It is here noted that, of these control units, at least the VCU 32 includes a Memory (M) 33 and a Processor (P) 34 having a purpose explained below. The ICE 38 is coupled for driving a gear train contained in a Gearbox (GB) 40 coupled for driving a pair of identical Generators (GEN 1) 42 and GEN 2) 44 with the gears of the gear train being selected for increasing the speed of the generators, for example, by a ratio of 3:1 over that of the output speed of the engine.

The Generators 40 and 42 are preferably 3-phase interior permanent magnet synchronous generators, but need not be. Respectively coupled to the Generators 42 and 44 are identical circuits defining Generator Inverters (GEN 1 INV) 46 and (GEN 2 INV) 48, these generator inverters acting, when commanded by the TCU 35, to generate a regulated DC Bus voltage. The Inverter 46 is coupled to first and second identical circuits defining Motor Inverters (MOT 1 INV) 50 and MOT 2 INV) 52, and, similarly, the Inverter 48 is coupled to third and fourth identical circuits defining Motor Inverters (MOT 3 INV) 54 and (MOT 4 INV) 56. A motor field protection circuit is provided for Motors 12 and 14 and includes a Resistor Grid (RES GRID 1) 58 electrically coupled to a Grid Inverter (GRID INV 1) 60, which is electrically connected to the Motor Inverters 50 and 52. Similarly, a motor field protection circuit is provided for the Motors 16 and 18 and includes a Resistor Grid (RES GRID 1) electrically connected to a Grid Inverter (GRID INV 2) 64, which is electrically coupled to the Motor Inverters 54 and 56. Finally, the TCU 35 is electrically coupled to electrically responsive Park Brake Valves (PB1 V) 66 and (PB2 V) 68, with the Valve 66 being hydraulically coupled to the Final Drives 20 and 22, and with the Valve 68 being hydraulically coupled to the Final Drives 24 and 26.

Figure 2:
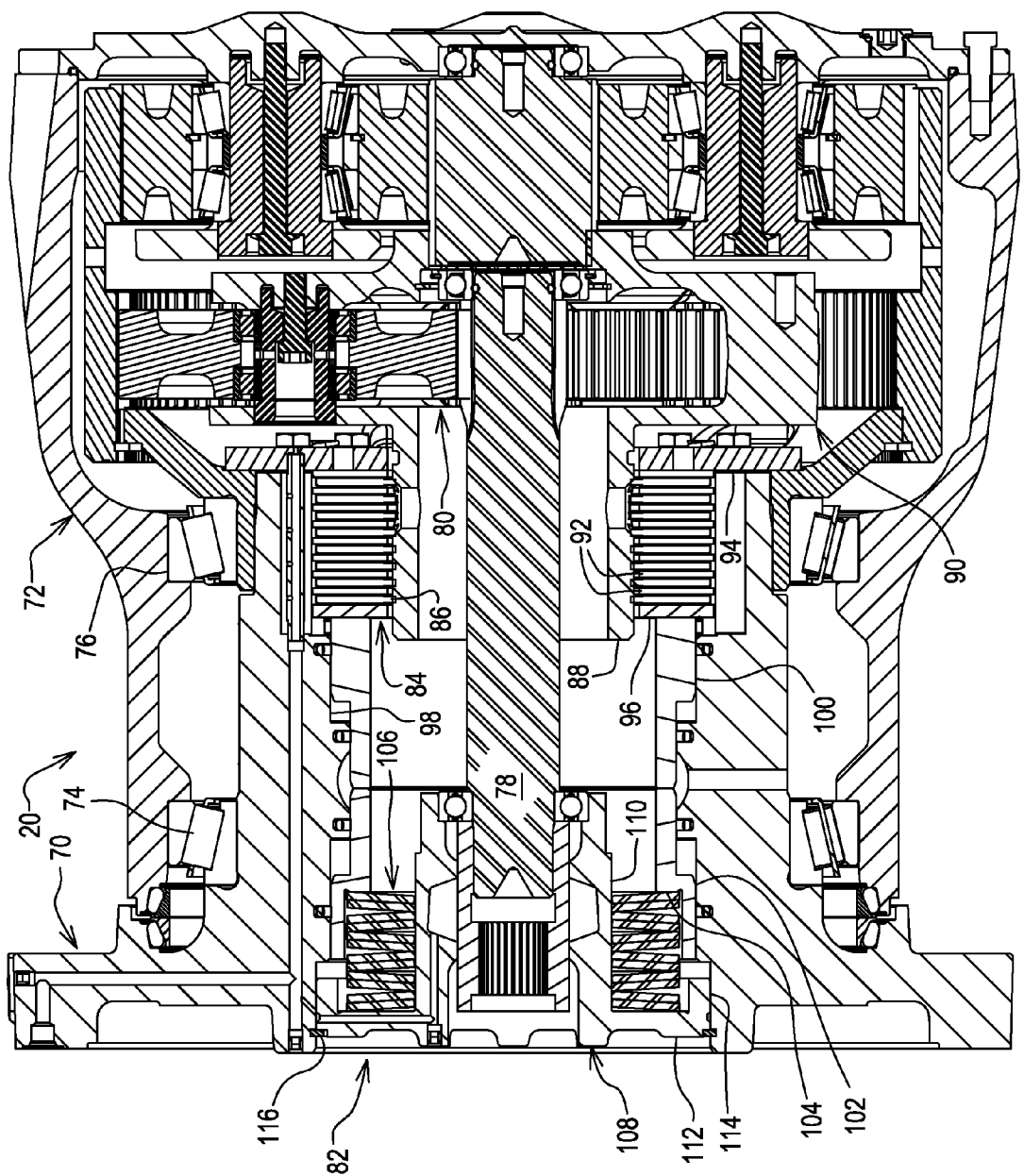
FIG. 2 is a longitudinal sectional view of a vehicle final drive arrangement adapted for being driven by one of the electric motors shown in FIG. 1.

Referring now to FIG. 2, there is shown details of the final drive assembly 20 of FIG. 1, with it being noted that since all of the final drive assemblies are identical, the details shown here apply to all of the final drives. Specifically, the final drive assembly 20 includes a spindle 70 on which a wheel hub 72 is rotatably mounted by axially inner and outer tapered wheel bearings 74 and 76, respectively. A drive shaft 78 extends centrally within the spindle 70 and wheel hub 72 and has an axially outer end coupled for driving the wheel hub 72 through the agency of a two-stage planetary reduction unit 80 located within an outer end region of the hub 72. An axially inner end of the shaft 78 is coupled for receiving driving torque from an output shaft of the electric motor 20 by a shaft coupler sleeve (not shown).

A park and service brake assembly 82 is provided for selectively braking rotation of the wheel hub 72 relative to the spindle 70. The brake assembly 82 comprises a disc brake pack 84 located within an axially outer end region of the spindle 70 and including a plurality of rotor discs 86 (eight being used in the present embodiment) having a splined connection with an annular cylindrical portion 88 of a first stage planet carrier 90 of the reduction unit 80, the cylindrical portion 88 extending axially inwardly through the disc brake pack 84. Interleaved with the rotor discs 86 are a plurality of stator discs 92 respectively having generally semi-cylindrical mounting ears (not shown) formed about a circumference thereof and respectively received within axially extending complementary shaped recesses (not shown) formed interiorly of, and extending axially inwardly from an outer end of, the spindle 70. Bolted to an axially outer end of the spindle 70 is an annular reaction plate 94. An annular pressure plate 96 also has a circumference provided with a plurality of generally cylindrical mounting ears (not shown) formed about a circumference thereof and received within certain ones of the aforementioned recesses formed interiorly of the spindle 70. A stepped brake piston bore 98 is provided in the interior of the spindle 70 at a location axially inwardly of the pressure plate 94, with axially outer and inner bore portions being located on opposite sides of, and being larger than, a center bore portion. An annular service brake piston 100 has a stepped outer surface with radially outer and inner portions being respectively mounted for sliding within the axially outer and middle bore portions of the bore 98, with an axially outer annular surface of the service brake piston 100 being engaged with the pressure plate 96. Shown having an annular axially outwardly facing surface engaged with an annular inwardly facing surface of the service brake piston 100 is an annular park brake piston 102 having a stepped outer surface with radially outer and inner portions being respectively mounted for sliding within the axially inner and middle bore portions of the bore 98. An inside surface of the park brake piston 102 is also stepped and defines an axially inward facing annular surface 104 bearing against an axially outer end of a stack of Belleville springs 106, the present embodiment having six pairs, with every other pair being reversed so as to form a so-called 2×6 stack, and with one end of the stack being located partly within an inner end portion of the park brake piston 102.

An input quill 108 includes a tubular cylindrical hub portion 110 projecting through the stack of Belleville springs 106 and having an inner end joined to an inner end plate portion 112 which extends radially and is joined to an axially outwardly projecting, annular cylindrical mounting portion 114, with the hub portion 110, plate portion 112 and mounting portion 114 cooperating to define an axially outwardly opening receptacle receiving an inner end portion of the stack of Belleville springs 106 with an inner end of the stack bearing against an axially outer surface of the plate portion 112. The mounting portion 114 of the quill 52 is tightly received within an inner end section of the spindle 70 and is held in place by a snap ring 116 engaged with an annular end surface of the quill 52 and received in an annular groove provided in the spindle 14.

The park and service brake assembly 82, as shown in FIG. 2, is in a park brake engage condition wherein the disc brake pack 84 is held in a compressed braking condition by the stack of Belleville springs 106 acting serially through the park brake piston 102 and the service brake piston 100, noting that the stack of Belleville springs 106 are partially compressed so as to exert a preload force compressing the brake pack 84.

Figure 3:
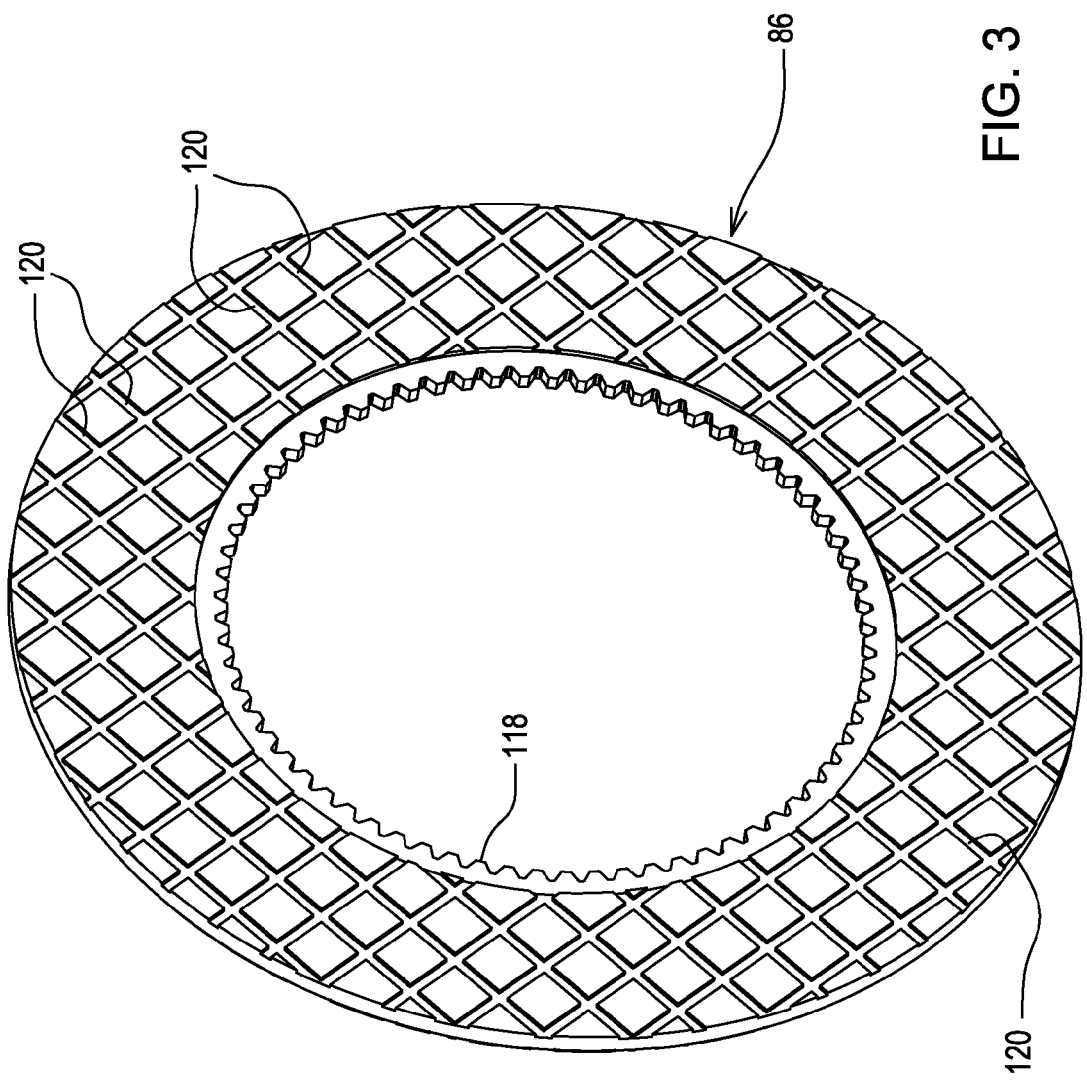
FIG. 3 is a perspective view of one of the rotor discs of the disc brake pack shown in FIG. 1.

Referring now also to FIG. 3, there is shown one of the rotor discs 86 having braking material 118 applied to opposite faces thereof (only one face shown), noting that the opposite faces of the stator discs 92 are smooth and have no braking material applied to them. In order for the disc brake pack 84 to have adequate life, it must be operated as a wet disc brake pack, and for the purpose of providing paths for cooling fluid to pass between the rotor and stator discs 86 and 92, the braking material 118 contains a checked pattern of fluid flow grooves 120. A typical thickness for the braking material 118 is 1 mm when the rotor discs 32 are new, this thickness being the unworn depth of the grooves 120.

During use, the various components of the disc brake pack 84 of each of the Final Drives 20, 22, 24 and 26 will undergo wear, especially the braking material 118. This wear can be monitored by a methodology taking advantage of the fact that the Final Drives 20, 22, 24 are respectively driven by the electric Motors 12, 14, 16 and 18, and that the stack of Belleville springs 106 is provided for applying a normal force the park brake pack 84 of each of the final drives. While the described final drive construction is preferred, it is to be noted that a final drive having a different compression spring arrangement would also benefit from the principles of the invention. Specifically, a compression spring arrangement wherein a plurality of individual compression springs are arrayed annularly for biasing the park brake piston could be used.

Referring now to FIG. 4, there is shown a typical load curve 122 for the 2×6 stack of Belleville springs 106, the curve plotting the preload exerted by the stack of springs for various stack heights of the springs. Located on the curve 122 is a data point A corresponding to the resistance offered by the stack of Belleville springs 106 when the stack has been fully compressed by fluid pressure acting on the park brake piston 102. As indicated by the data point A, the stack of springs 106 offer a resistance of about 71,000 Newtons (N) and have a compressed height of about 73 mm, this height being at a point just before the stack becomes solid. Also shown is a data point B which corresponds to a condition wherein the disc brake stack 84 is new and the park brake is "ON", with all brake control pressure being released. At data point B, the preload offered by the stack of springs 106 is approximately 69,000 N with the stack height of the springs being approximately 81 mm. Another data point located on the curve 106 is data point C which is a point corresponding to a condition wherein the disc brake pack 84 is considered worn out for safe vehicle operation, noting that this occurs when the preload exerted by the stack of springs 106 is approximately 58,000 N, with the spring stack height being about 93 mm. Thus, assuming that all of the wear of the disc brake pack 84 occurs in the braking material 118 comprising opposite faces of the each of the eight rotor discs 84, and that the thickness of the material 118 on each face is 1 mm, it can be determined that, when new, the rotor discs have a total of 16 mm of braking material, with approximately 75% or 12 mm of the braking material 118 being worn away when the worn out condition of the disc brake pack 84 exists. Thus, it is desirable for an operator to be notified when less than 75% of the braking material 118 has been worn away in order for maintenance to be scheduled before the disc brake pack 84 reaches the worn out condition. For example, a condition where half the braking material 118 is worn away could be considered and this condition is indicated by data point D on the curve 122 which occurs with the preload exerted by stack of springs 106 being approximately 64,000 N at a stack height of about 89 mm, indicating that 50% of the braking material 118 of the brake pack 31 has worn away.

Preparations for testing the integrity of the park brakes and/or the wear in the disc brake pack 84 of each of the Final Drives 20, 22, 24 and 26 includes placing the load curve 122 of the 2×6 stack of Belleville springs 106 in the Memory 33 of the Vehicle Control Unit 32. In addition, a value equal to the holding force required to be exerted by the park brake to meet ISO 3405/MSHA braking requirements without brake slippage would be stored in the memory along with a preselected minimum spring holding force value at which the operator is to be alerted that steps need to be taken to service the disc brake pack 84. Also, if desired, a look-up table (not shown) containing operating data, such as current versus torque data, or the like, relating to the identical Motors 12, 14, 16 and 18 could be placed in the Memory 33.

Operation for measuring brake wear of each of the Final Drives 20, 22, 24 and 26 is done with the vehicle located on a substantially level location with the park brake engaged and the engine 38 idling. The operator initiates the testing of the park brakes by sending a test request signal from the Operator Interface Control Unit 27 to the Vehicle Control Unit 32 which, in turn, sends a signal to the Engine Control Unit 36, by way of the Transmission Control Unit 35, causing the speed of the ICE 38 to increase from the idle speed, this speed being 1800 rpm, for vehicle embodying the present invention, for example. The TCU 35 also sends a command signal to the Generator Inverters 46 and 48 to generate a regulated DC bus voltage. The TCU 35 then causes an electrical signal to be sent to the Park Brake Valve 66 causing it to couple pressure fluid to the park brake pistons 102 of the Final Drives 20 and 22, thereby effecting release of the park brakes by compressing the stacks of Belleville springs 106. The TCU 35 then sends a signal to the OICU 27, by way of the VCU 32, that lights an indicator light at the Display 29, or actuates some other device, to alert the operator that conditions are set for running the park brake test.

The TCU 35 then automatically sends a signal back to the OICU 27, by way of the VCU 32, that energizes a portion of the Display 29 by which the operator is requested to raise the loader boom (not shown) of the loader above a pre-set threshold height so that a valid brake test may be run. After this action is completed, the TCU 35 sends a signal, by way of the VCU 32, back to the OICU 27 requesting the operator to press a throttle, which forms part of the Control Input Devices 28, when ready for the test to begin.

Once the operator presses the throttle of the CIDS 28, a signal is sent from the OICU 27 to the TCU 35, by way of the VCU 32, which causes the current supplied to the Motor Inverters 54 and 56 to be controlled by sequential switching the stator phases of the Motors 16 and 18 so as to incrementally increase a magnetic force on the respective rotors of the motors tending to rotate the rotors from one position to the next. The incremental increase in the magnetic force tending to rotate the motor shafts continues until the sufficient torque has built up to overcome the resistance to rotation caused in the brake disc pack 84 of each of the Final Drives 24 and 26 by the preload of the stack of Belleville springs 106. Once the torque applied to the motor shaft 78 of each of the Final Drives 24 and 26 equals the break away or break free torque, the rotor discs 86 will slip relative to the stator discs 92. This causes the torque requirement to immediately drop, indicating that the immediately previous torque output of the respective motors 16 and 18 is the break free torque, with these values being recorded by the TCU 35 and sent to the Memory 33 of the VCU 32 where a break free torque value is calculated or determined from a look-up table placed in the Memory 33 based on the strength of the current being sent to the motor at the time of break away. Using this break free torque, the corresponding force (Fw) exerted by the stack of Belleville springs 50 is back-calculated by the Processor 34 of the VCU 32 using the equation: $Fw = Torque/(Re)(\mu)(Nf)$ where:

Torque is Brake Torque Capacity (Nm) determined by multiplying the Motor Input torque by the Final Drive Ratio;

Re is the Effective Friction Radius (mm) of the brake rotor discs (122 mm in the instant case);

Fw is the Spring working Height Apply Force (N);

$\mu$ is the Coefficient of Friction of the brake material (0.100 for the brake material 64); and Nf is the Number of Friction Interface Surfaces (16 in the instant case where 8 rotor discs 86 are used).

The calculated force Fw (spring preload) is then used to enter the stored load curve 106 of the 2×6 stack of Belleville springs 106 to arrive at the corresponding stack height, this height being compared with that of a stack of new springs in order to determine the amount of wear that the disc brake packs 84 of each of the Final Drives FD 24 and FD 26 have experienced. This calculated spring preload is then compared to the spring load which has been stored in the Memory 33 as that at which the operator is to be alerted that steps need to be taken in the near future for servicing the brake packs 84. If the calculated spring load is equal to, or less than, that loaded in memory, then the VCU sends an alert signal to the Alert 30 of the OICU 27.

Once the test of the park brakes of the Final Drives 24 and 26 is complete, the TCU sends respective signals releasing the park brakes of the Final Drives 24 and 26 and applying the park brakes of the Final Drives 20 and 22. The steps stated above following the release of the park brakes of the Final Drives 20 and 22 and the application of the park brakes of the Final drives 24 and 26 are then followed for testing the park brakes of the Final Drives 20 and 22.

In case of daily tests of the park brakes made to determine if the park brakes meet the safety standard set forth in the ISO 3405/MSHA braking requirements for a particular vehicle, it is not necessary to control the current supplied to each of the motors to incrementally increase the magnetic forces tending to rotate the motor rotor or shaft until the break away or break free torque is reached. Rather, it is necessary only for the Processor 34 of the VCU to continuously compute the holding force from the incrementally increasing induced torsional forces and compare these computed forces to the holding force stored in the Memory 34 and being that required to meet the ISO 3405/MSHA braking requirements. Once the computed force equals or exceeds the stored force, the operator is informed that the tested brakes have passed the test. The stack height of the 2×6 stack of Belleville springs 106 corresponding to the computed holding force is automatically retrieved from the stored load curve 122, and while the break away torque has not been reached, the stack height will give some indication of wear so that operator has some idea as to when to schedule service.

Having described the preferred embodiment, it will become apparent that various modifications can be made without departing from the scope of the invention as defined in the accompanying claims.

The invention claimed is:

1. A method of determining disc brake wear in a final drive arrangement including a spindle having a cylindrical section, a wheel hub mounted for rotation about said spindle, a drive shaft extending axially in said spindle and being coupled for driving said wheel hub, an electric motor coupled to said drive shaft, a disc brake arrangement including: a plurality of rotor discs mounted for rotation with said hub and interleaved with a plurality of stator discs mounted to said spindle thereby forming a disc brake pack, a compression spring arrangement mounted in axial alignment with said disc brake pack and normally being compressed for establishing a preload biasing the rotor and stator discs together so as to establish a park brake engaged condition, and a park brake release hydraulic piston being mounted for powered engagement with said spring arrangement, thereby making it possible to selectively apply a force against the spring arrangement so as to establish a park brake-release condition, said method comprising the following steps:

a. establishing said park brake engaged condition in said disc brake pack when the brake pack is new;

b. sending an increasing drive torque command to said electric motor for causing an increase drive torque to be delivered to said drive shaft until said drive torque reaches an initial break away torque value corresponding to when said disc brake pack is new and said rotor discs slip relative to said stator discs;

c. using said initial break away torque value to compute a corresponding initial preload exerted by said compression spring arrangement when said disc brake pack is new;

d. repeating step b during the service life of said disc brake pack with said increasing drive torque being delivered to said shaft until said drive torque reaches a subsequent break away torque value corresponding to when said disc brake pack is worn and said rotor discs slip relative to said stator discs;

e. using said subsequent break away torque value to compute a corresponding subsequent preload exerted by said compression spring arrangement when said disc brake pack is worn; and f. consulting a load curve pertaining to said compression spring arrangement containing compression spring preloads plotted against compression spring arrangement heights and noting the difference in the heights respectively corresponding to said initial and subsequent preloads, this height difference being equal to an amount of wear of said disc brake pack.

2. A method of determining the reliability of a disc brake in a final drive arrangement including a spindle having a cylindrical section, a wheel hub mounted for rotation about said spindle, a drive shaft extending axially in said spindle and being coupled for driving said wheel hub, an electric motor coupled to said drive shaft, a disc brake arrangement including: a plurality of rotor discs mounted for rotation with said hub and interleaved with a plurality of stator discs mounted to said spindle thereby forming a disc brake pack, a compression spring arrangement mounted in axial alignment with said disc brake pack and normally being compressed for establishing a preload biasing the rotor and stator discs together so as to establish a park brake engaged condition, and a park brake release hydraulic piston being mounted for powered engagement with said spring arrangement, thereby making it possible to selectively apply a force against the spring arrangement so as to establish a park brake-release condition, said method comprising the following steps:

a. establishing said park brake engaged condition in said disc brake pack;

b. sending an incrementally increasing drive torque command to said electric motor for causing an incrementally increasing drive torque to be delivered to said drive shaft;

c. continuously computing respective preloads exerted by said compression spring arrangement in order for said disc brake pack to resist breaking away in response to said incrementally increasing drive torque; and d. continuing incrementally increasing the drive torque and comparing said computed preloads with a required preload for meeting ISO 3045/MSHA braking requirements for a vehicle containing said final drive arrangement, with the park brake meeting the braking requirement when a last computed preload equals or exceeds said required preload.

3. In a final drive arrangement including a spindle having a cylindrical section, a wheel hub mounted for rotation about said cylindrical section of said spindle, a drive shaft extending axially in said spindle and being coupled for driving said wheel hub, an electric motor having an output shaft coupled to said drive shaft, a disc brake arrangement including: a plurality of rotor discs mounted for rotation with said hub and interleaved with a plurality of stator discs mounted to said spindle thereby forming a disc brake pack, a compression spring arrangement mounted in axial alignment with said disc brake pack and normally biasing the rotor and stator discs together so as to establish a park brake engaged condition, and a park brake release hydraulic piston being mounted for powered engagement with said compression spring arrangement, thereby making it possible to selectively apply a force against the compression spring arrangement so as to establish a park brake release condition, a brake condition measuring arrangement, comprising:

an engine having an output shaft;

an electrical engine control unit being coupled for controlling said engine;

at least one electric power generator coupled for being driven by said output shaft;

a generator inverter being coupled to said at least one electric power generator;

a motor inverter being coupled to said generator inverter;

at least one electric motor being connected for receiving power from said at least one motor inverter;

an electrical transmission control unit coupled to said generator inverter and being operable for selectively controlling current flowing to said motor inverter from said generator inverter so as to incrementally increase a torque inducing force tending to rotate said motor output shaft and said drive shaft to the point where said torque reaches a break away torque resulting in said rotor discs rotating relative to said stator discs, with said transmission control unit recording said break away torque;

a vehicle control unit being coupled for communicating with said transmission control unit and including a memory and a processor, with said processor computing a preload force of said spring arrangement corresponding to said break away torque; and a spring load curve containing preloads of said compression spring arrangement plotted against spring heights of said spring arrangement being stored in said memory of said vehicle control unit, and said vehicle control unit acting to find and record a spring height corresponding to said preload force corresponding to said break away torque, whereby recorded spring heights from a first and a subsequent brake test may be compared to determine the wear of the brake disc pack occurring between the first and subsequent tests.

* * * * *